(12) United States Patent
Field (10) Patent No.: US 8,052,784 B2
(45) Date of Patent: Nov. 8, 2011

(54) HYDROGEN STORAGE AND RELEASE SYSTEM

(75) Inventor: Leslie A. Field, Portola Valley, CA (US)

(73) Assignee: Empire Technology Development LLC, Wilmington, DE (US)

( * ) Notice: Subject to any disclaimer, the term of this patent is extended or adjusted under 35 U.S.C. 154(b) by 131 days.

(21) Appl. No.: 12/434,414

(22) Filed: May 1, 2009

(65) Prior Publication Data
US 2010/0278722 A1   Nov. 4, 2010

(51) Int. Cl.
*F17C 11/00* (2006.01)
*F17C 13/00* (2006.01)

(52) U.S. Cl. ............... 96/146; 206/7; 423/658.2
(58) Field of Classification Search .......... 96/108, 96/146; 95/90; 423/648.1, 658.2; 420/900; 206/0.7; 222/3; 429/416, 421
See application file for complete search history.

(56) References Cited

U.S. PATENT DOCUMENTS

| | | | | |
|---|---|---|---|---|
| 4,165,569 A * | 8/1979 | Mackay | ............... | 34/416 |
| 4,187,092 A * | 2/1980 | Woolley | ............... | 62/46.2 |
| 4,270,360 A | 6/1981 | Nakane et al. | | |
| 7,112,239 B2 * | 9/2006 | Kimbara et al. | ............... | 96/108 |
| 7,651,554 B2 * | 1/2010 | Tan et al. | ............... | 96/108 |
| 2004/0142222 A1 | 7/2004 | Yang et al. | | |
| 2004/0241507 A1 | 12/2004 | Schubert et al. | | |
| 2007/0180998 A1 * | 8/2007 | Arnold et al. | ............... | 96/108 |

FOREIGN PATENT DOCUMENTS

| | | |
|---|---|---|
| EP | 1914543 A1 * | 4/2008 |
| WO | WO 9736819 | 10/1997 |
| WO | WO 2007/050362 A2 | 5/2007 |
| WO | WO 2009039309 | 3/2009 |

OTHER PUBLICATIONS

Julie Moberly, "A Zeal for Zeolites", NASA Webpage, http://spaceresearch.nasa.gov/research_projects/zeolites_02-2003.html, Feb. 5, 2003, pp. 1-4.
James E. Shelby and Matthew M. Hall, "A Radically New Method of Hydrogen Storage in Hollow Glass Microspheres" Article, Sep. 1, 2004-Feb. 28, 2007, Alfred, NY, pp. 1-2.
G.G. Wicks, L.K. Heung, R.F. Schumacher, "Microspheres and Microworlds," American Ceramic Society Bulletin, pp. 23-28, vol. 87, No. 6.
Salvador M. Aceves and Gene D. Berry, "Thermodynamics of Insulated Pressure Vessels for Vehicular Hydrogen Storage" prepared for submittal to International Mechanical Engineering Congress and Exposition, Jun. 30, 1997, pp. 1-16.

(Continued)

*Primary Examiner* — Frank Lawrence, Jr.
(74) *Attorney, Agent, or Firm* — Jensen & Puntigam, PS (57) ABSTRACT

Systems and methods are provided for storing and releasing hydrogen using packed-bed hydrogen storage elements in conjunction with elements such as optical or thermal energy for stimulating the release of stored hydrogen. The hydrogen storage system may include valves, piping, and other fixtures for ease of filling and emptying the unit. The system may also serve as a portable self-contained means of safe hydrogen storage that may be transported between the filling or generation site and the site of hydrogen release or use.

16 Claims, 8 Drawing Sheets

OTHER PUBLICATIONS

"Hydrogen Storage," Wikipedia Webpage, http://en.wikipedia.org/wiki/Hydrogen_storage, May 3, 2009, pp. 1-8.

James Shelby and Matthew Hall, "Glass Microspheres for Hydrogen Storage," Alfred University Presentation, Alfred, NY, pp. 1-10.

J. Weitkamp, "Zeolites as Media for Hydrogen Storage," Research Summary, Institut fur Technische Chemie I, Universitat Stuttgart, Pfaffenwald 9, 70569 Stuttgart, Germany, pp. 1-4, available at http://www.uni-stuttgart.de/sfb270/B7_E.htm.

"Microcavity processes for Hydrogen Storage, Transport and Supply Systems," SML Associates Webpage, http://smlassociates.com/glasspheres.shtml, 2002, pp. 1-6.

James Shelby, Matthew Hall, and Robert Doremus, "Photo-enhanced Hydrogen Diffusion Through Glass Microspheres: Development of Microsphere Production for Hydrogen Storage", CEER Webpage, http://ceer.alfred.edu/Research/glassdiffusion.html, Jul. 2004-Dec. 2005, pp. 1-4.

International Search Report, PCT/US2010/032894, Jun. 18, 2010.

* cited by examiner

FIG. 1

130 PACKED-BED HYDROGEN
STORAGE COLUMN

133 OPEN END

131 HYDROGEN-ABSORBING
MATERIAL

132 COLUMN CASING

FIG. 2

140 HYDROGEN RELEASE
STIMULUS ELEMENT

142 TUBE CASING

141 LIGHTING OR
HEATING ELEMENTS

520 Hydrogen Extraction Member Airtight Cavity

510 Hydrogen Extraction Member Sidewall

Direction of Hydrogen Flow

601 Valve for Airtight Engagement of Hydrogen Storage Unit

600 Hydrogen Extraction Member (To Hydrogen Destination)

HYDROGEN STORAGE AND RELEASE SYSTEM

BACKGROUND

Hydrogen, the most abundant element in the universe, has great potential as an energy carrier. However, it is highly unstable and dangerous to produce, store, transport, and deploy (due to being extremely flammable and explosive when mixed with oxygen, an abundant element in Earth's atmosphere). Unlike petroleum, hydrogen may be easily generated from diverse energy sources, including: fossil fuels such as coal and natural gas; nuclear power; biomass; and, other renewable energy technologies such as wind, solar, geothermal, and hydroelectric power. Hydrogen is also non-polluting, forming water as a harmless byproduct during use. Approximately half of the hydrogen produced today is converted to ammonia and used as a fertilizer. The remaining current hydrogen production is used to convert heavy petroleum sources into lighter fractions suitable for use as fuels which are then used in a variety of applications, such as fuel-cell batteries for a variety of consumer and industrial electronics, and in combustion engines for automobiles and heavy machinery. However, the difficulty and significant safety hazards of storing hydrogen has been a challenge to harnessing the many advantages of hydrogen use.

Developing safe, reliable, compact, and cost-effective hydrogen storage technologies is one of the most technically challenging barriers to the widespread use of hydrogen as a form of energy. Hydrogen storage research has focused largely on technologies and systems used onboard a vehicle in an attempt to improve the weight, volume, and cost of current vehicle-based hydrogen storage systems, as well as to identify and develop new technologies that may achieve similar performance, at a similar cost, as gasoline fuel storage systems. This is a challenging goal because hydrogen has physical characteristics that make it difficult to store in large quantities without taking up a significant amount of space. For example, to be competitive with conventional gasoline powered vehicles, hydrogen powered cars are desired that that may travel on the order of 300 miles between fills.

Hydrogen has a high energy content by weight (about three times more than gasoline), but it has a low energy content by volume (about four times less than gasoline). These properties, along with the aforementioned serious safety considerations, make hydrogen a challenge to store, particularly within the size and weight constraints of a vehicle. However, there are many uses for hydrogen today, such as ammonia production and other example uses set forth above. The focus on overcoming problems with hydrogen-powered vehicles may distract from developing improved hydrogen technologies in other areas. Furthermore, some developments for primary purposes other than on vehicles will undoubtedly find use in vehicles as well.

Improved hydrogen storage systems are needed. Hydrogen storage may desirably be safe, low-cost, efficient to transport, and easily interfaced to other hydrogen systems such as hydrogen production systems, hydrogen storage systems, ammonia production systems, and electricity and power production systems such as fuel cells, laptop power supplies, and automobile engines.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and made part of this disclosure.

The present disclosure describes technologies for storing and releasing hydrogen using one or more hydrogen storage elements in conjunction with elements for providing hydrogen release stimulus energy such as optical or thermal energy to promote hydrogen release.

One approach to the difficulties of storing hydrogen involves the use of adsorption (storing hydrogen molecules on the surfaces of solids). Adsorption is typically on surfaces; absorption also encompasses take-up within the pores or interior of a material. However, the terms adsorption and absorption are used interchangeably herein. Zeolites and carbon nanotubes have shown promise in this area because they are small enough to enable reversible hydrogen capture (for example, by applying heat for hydrogen release) and have a surface chemistry that favors hydrogen migration and adsorption. The use of adsorption may make it possible to store larger quantities of hydrogen in smaller volumes at low pressure and at temperatures close to room temperature. Alternatively, hydrogen may be stored in hollow glass microspheres and released by applying light, or stored in metal hydride systems. Thus, a system for storing and releasing hydrogen is proposed, in which hydrogen may be stored in adsorptive packed beds comprising hollow glass microspheres, zeolites, carbon nanofibers, metal hydrides, or the like, within a stainless steel or other container equipped with suitable fittings that allow it to be valved and connected as appropriate with devices and equipment for hydrogen generation, transmission, and consumption. The hydrogen may be stored under various amounts of pressure and heat, depending on the storage and absorption materials used. The zeolites, carbon nanotubes, metal hydrides, or hollow glass microspheres may be interspersed with heating or lighting devices to provide for hydrogen release. The hydrogen storage system may be configured with valves, piping, and other fixtures to allow ease of filling and emptying the storage unit. The system may also serve as a portable self-contained apparatus for safe hydrogen storage that may be transported between the filling or generation site and the site of hydrogen release or use.

Figure 1:
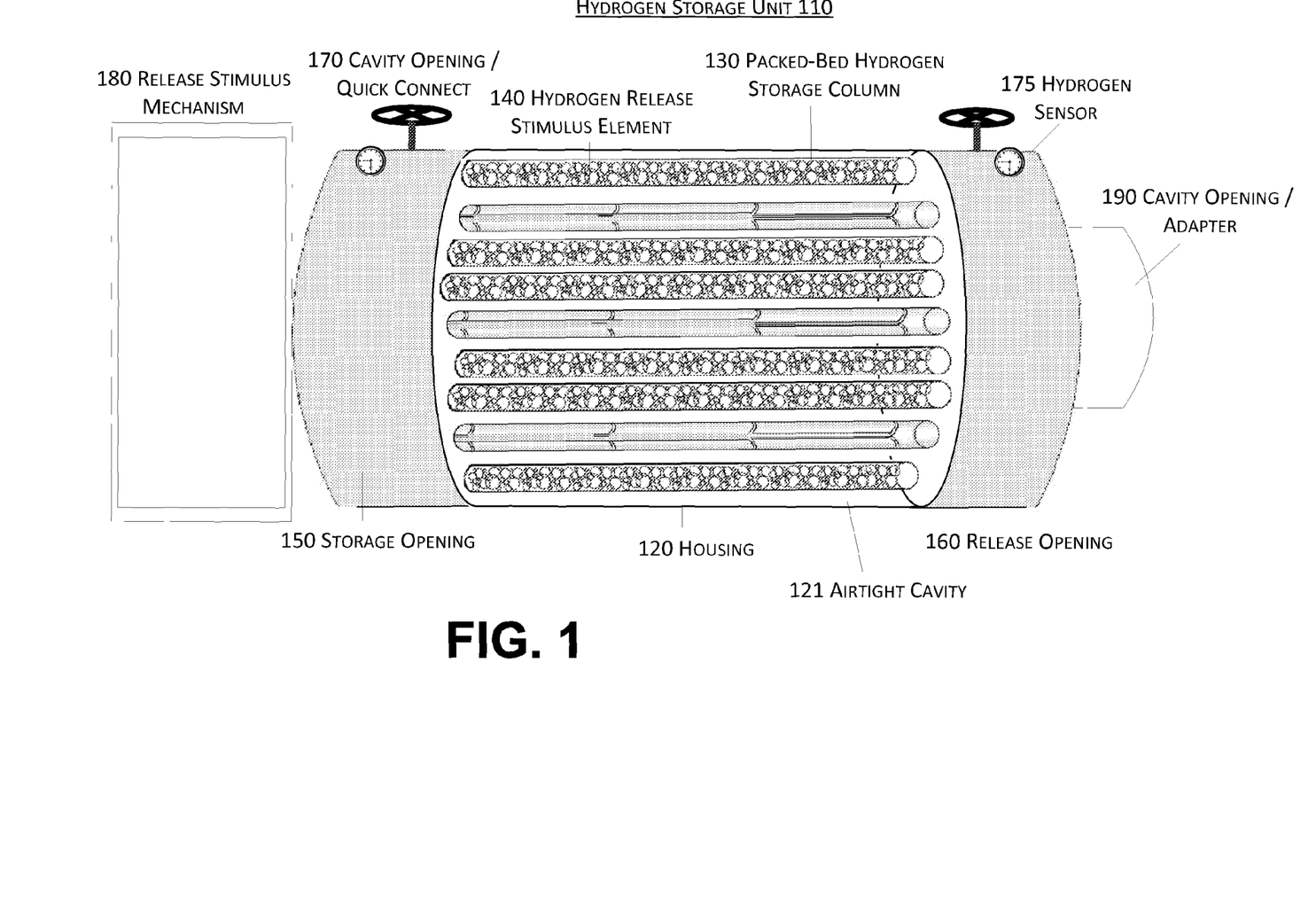
FIG. 1 is a diagram of an example hydrogen storage unit.

FIG. 1 is a diagram of an example hydrogen storage unit. The hydrogen storage unit 110 comprises a housing 120 forming an airtight cavity 121 that contains a plurality of packed-bed hydrogen storage columns 130 and hydrogen release stimulus elements 140. The hydrogen storage unit 110 may include a storage opening 150 and a release opening 160, each optionally fitted with a cavity opening/quick connect valve 170 and a hydrogen sensor 175, respectively. The hydrogen storage unit 110 may also be fitted with one or more cavity opening/adapters 190 to facilitate the transfer of hydrogen in and out of the storage unit 110. The hydrogen storage unit 110 may be coupled to a release stimulus mechanism 180 to facilitate the release of hydrogen from the storage columns 130 and the unit 110. An example release stimulus mechanism 180 is further discussed as element 430 in FIG. 6.

The hydrogen storage unit housing 120 may be made of stainless steel tubing or like material that is preferably impervious to water, air, and light, and that is heat resistant and non-corroding. The hydrogen storage unit housing 120 may be insulated, for example by layering an insulating material on an interior or exterior of the housing. The housing 120 may have these properties to prevent inadvertent release of the stored hydrogen through exposure to heat or light. Furthermore, the hydrogen storage unit 110 may comprise an airtight cavity 121 and contain tightly-sealed storage and release openings 150, 160 in order to safely store the hydrogen. The unit 110 may be fitted with one or more hydrogen sensors 175 at any opening to detect and contain potential hydrogen leaks. In some embodiments, the hydrogen storage unit 110 may comprise an insulated pressure vessel.

The hydrogen storage unit 110 also may comprise a plurality of packed-bed hydrogen storage columns 130 and hydrogen release stimulus elements 140. A packed bed may comprise a hollow tube, pipe, or other vessel that is filled with a packing material and used to store hydrogen. The packed-bed hydrogen storage columns 130 in FIG. 1 may comprise a hydrogen-absorbing material, such as zeolites, carbon nanotubes, metal hydrides, hollow glass microspheres, or other material with the property of hydrogen absorption, packed inside column casings.

Zeolites are generally considered to be aluminosilicate minerals that tend to have a regular microporous structure, allowing them to selectively sort molecules based primarily on a size and shape exclusion process. In some embodiments, the zeolites may be deployed in conjunction with an alumina extrudate or other type of support. In some embodiments, zeolites may absorb hydrogen at close to ambient conditions and seal the stored hydrogen through a very slight cooling process (perhaps as small as a 0.1° Celsius decrease in temperature). Application of temperature differences for storage and release of hydrogen may similarly be applied with all of the various hydrogen storage material options discussed herein. Zeolites are also responsive to pressure, such that increasing the amount of pressure causes more hydrogen to be forced into the cavities of the zeolite and trapped there by the cooling process.

Carbon nanotubes comprise carbon nanostructures that often have large length-to-diameter ratios, for example on the order of 28,000,000:1, which is unequalled by any other material, although such a length-to-diameter ratio is not required. They exhibit extraordinary strength and unique electrical properties, and are efficient conductors of heat as well as hydrogen-absorbing, which may produce additional advantage to the use of carbon nanostructures in embodiments using heat as a hydrogen release stimulus.

Metal hydrides comprise metals that absorb hydrogen. For example, at room temperature and atmospheric pressure, palladium may absorb up to 900 times its own volume of hydrogen and may thus serve as a safe and efficient hydrogen storage medium.

Glass microspheres comprise porous hollow microscopic spheres of glass with typical diameters including those ranging from 10 to 300 micrometers. Glass microspheres are lightweight and extremely strong, due to their shape and size, and their use results in a greater storage capacity than bulk glass or other commonly-used storage elements. They may be filled with materials that may absorb and store the hydrogen that enters through the porous walls of the microsphere, and may subsequently release the stored hydrogen upon the application of heat or light. In some embodiments, involving photo-enhanced hydrogen diffusion, the glass may be "doped" with an optically active element, causing the rapid release of hydrogen upon stimulation by an infrared lamp. This property may produce additional advantage to the use of glass microspheres in embodiments using light as a hydrogen release stimulus.

The process by which hydrogen is stored in hollow glass microspheres may involve heating the glass microspheres in an atmosphere of hydrogen, causing the hydrogen to diffuse through the pores of the microspheres. Upon cooling, the diffusion rate lowers and the hydrogen inside the microspheres is trapped. The microspheres may then be stored under ambient conditions as a fine powder until hydrogen release is desired, at which time the microspheres may be reheated in a low-pressure vessel, causing the hydrogen to diffuse out of the microspheres.

A packed-bed arrangement is traditionally used for arranging catalyst or sorbent materials in fixed-bed chemical and petrochemical refining and in gas chromatography. Gas chromatography is used in organic chemistry for separating and analyzing compounds that may be vaporized without decomposition. The packed-bed method allows access to hydrogen as it is inlet or released, while immobilizing the hydrogen storage material for convenient use and reuse.

In some embodiments, the hydrogen storage columns 130 may comprise tubular airtight housings with an opening on at least one end to allow laminar flow of released hydrogen after the hydrogen release stimulus elements 140 are activated. In other embodiments, the hydrogen storage columns 130 may comprise tubular housings that are permeable to hydrogen such that the hydrogen transfers through the sidewalls of the housings when the hydrogen release stimulus elements 140 are activated, thereby allowing faster access to the storage material when filling and releasing the hydrogen.

The hydrogen release stimulus elements 140 may provide light, heat, or the like to facilitate release of hydrogen from the storage media. For example, the hydrogen release stimulus element 140 may comprise a bundle of optical fibers arranged to illuminate along the length of the bundle by providing lateral optical outlets along the length of the bundle-containing tube. Alternatively, the release stimulus elements 140 may be illuminated, for example, by shining a bright diffuse light into it or, in the case of photo-enhanced diffusion, applying intense infrared light. In other embodiments, the hydrogen release stimulus element 140 may be configured to provide heat, for example, by filling the tube with warm gas or steam at a desired temperature. In this embodiment, the heating element may be plumbed separately from the hydrogen flow path to avoid diluting hydrogen with steam. Alternatively, the hydrogen release stimulus element 140 may comprise an inductive heating mechanism, with insulation or additional precautions to reduce flammability or explosion hazards from heat sources near or within the ambient stored hydrogen.

The hydrogen storage unit 110 may contain one or more cavity openings/adapters 190 to allow convenient interface with valves, piping, and other fixtures, for example to facilitate the transfer of hydrogen into the storage unit, to connect the storage unit 110 to a release stimulus mechanism 180, or to transfer the hydrogen into a destination. The cavity opening/quick connect valves 170 may also be used for this purpose, depending on the configuration of the apparatus being connected to the hydrogen storage unit 110.

Figure 2:
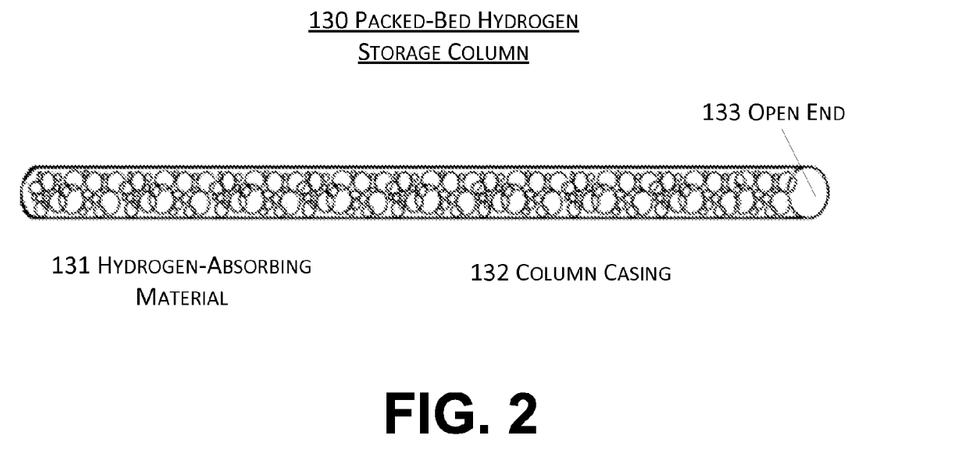
FIG. 2 is a diagram of an example packed-bed hydrogen storage column as one component of the hydrogen storage unit illustrated in FIG. 1.

FIG. 2 is a diagram of an example packed-bed hydrogen storage column as one component of the hydrogen storage unit illustrated in FIG. 1. The hydrogen storage column 130 comprises a column casing 132 and a hydrogen-absorbing material 131 disposed inside the casing 132, and may contain at least one open end 133.

As discussed in FIG. 1, the column casing 132 may comprise a tubular airtight housing with an opening 133 on at least one end to allow laminar flow of released hydrogen. In other embodiments, the column casing 132 may comprise a tubular housing that is permeable to hydrogen. A permeable column casing 132 would permit hydrogen to transfer through the sidewalls of the column casing 132, allowing more rapid hydrogen storage or transfer to a destination. Similarly, in some embodiments the column casing 132 may be permeable to light or heat, causing the stimulus elements to trigger the release of hydrogen once the column casing 132 is exposed to a heat or light stimulus. Also, it will be readily appreciated that a tubular or cylindrical shape is not required and square, rectangular or other polygonal column casing cross-section shapes are also possible. The term "column casing" as used herein should not be construed as limited to circular column cross-sections.

As discussed in FIG. 1, the hydrogen-absorbing material 131 may comprise zeolites, carbon nanotubes, metal hydrides, hollow glass microspheres, or other materials that bind to hydrogen and allow it to be stored within the storage column. These materials may be placed in the column casing 132 using any available techniques, such as, for example, those used to produce the fixed beds used in chemical and petrochemical processing/refining operations or the packed columns used in gas chromatography. The material 131 may be of varying size and density, depending on the desired scale of hydrogen storage and release.

Figure 3:
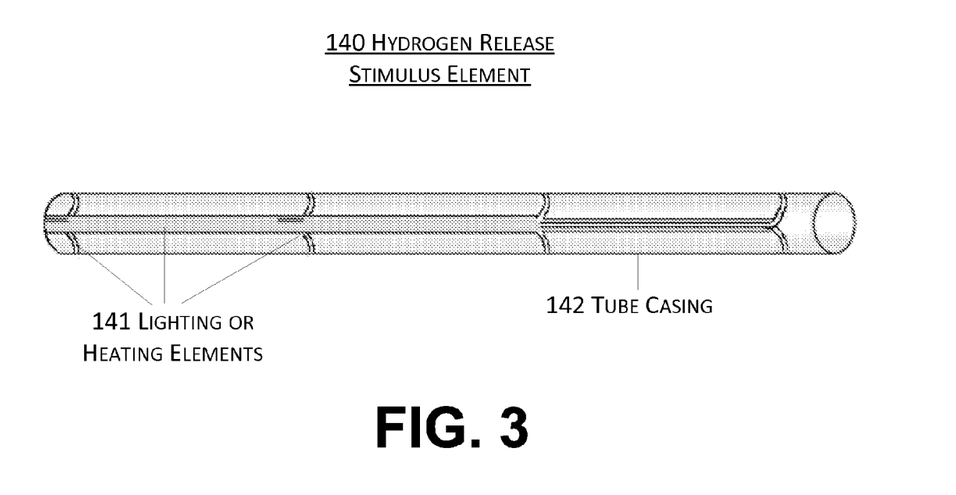
FIG. 3 is a diagram of an example hydrogen release stimulus element as one component of the hydrogen storage unit illustrated in FIG. 1.

FIG. 3 is a diagram of an example hydrogen release stimulus element as one component of the hydrogen storage unit illustrated in FIG. 1. Hydrogen release stimulus element 140 comprises a tube casing 142 and a plurality of lighting or heating elements 141 dispersed throughout the tube casing 142.

As discussed in FIG. 1, the hydrogen release stimulus element 140 may facilitate release of hydrogen from the storage media through the application of light or heat. In some embodiments that involve the application of light, the lighting or heating elements 141 may comprise a bundle of optical fibers arranged to illuminate along the length of the bundle by providing lateral optical outlets along the length of the bundle-containing tube. Alternatively, the tube may be illuminated, for example, by shining a bright diffuse light or an intense infrared light into it. In these embodiments, the tube casing 142 may comprise glass or other light-sensitive material. In other embodiments that involve the application of heat, the lighting or heating element 141 may comprise a series of tubes to distribute warm gas or steam at a desired temperature. In these embodiments, the heating element may be plumbed separately from the hydrogen flow path to avoid diluting the hydrogen with steam. Alternatively, the lighting or heating element 141 may comprise an inductive heating mechanism such as a series of wires distributed along the tube, with insulation or additional precautions to reduce flammability or explosion hazards from heat sources near or within the ambient stored hydrogen.

In some embodiments, a computing device may be used to carry out one or more of the operations necessary to store, monitor, and/or release hydrogen as is described in a variety of the appended figures. Appropriate software may implement a user interface on the computing device, allowing for user control and specification of hydrogen storage, monitoring, and release instructions.

Figure 4:
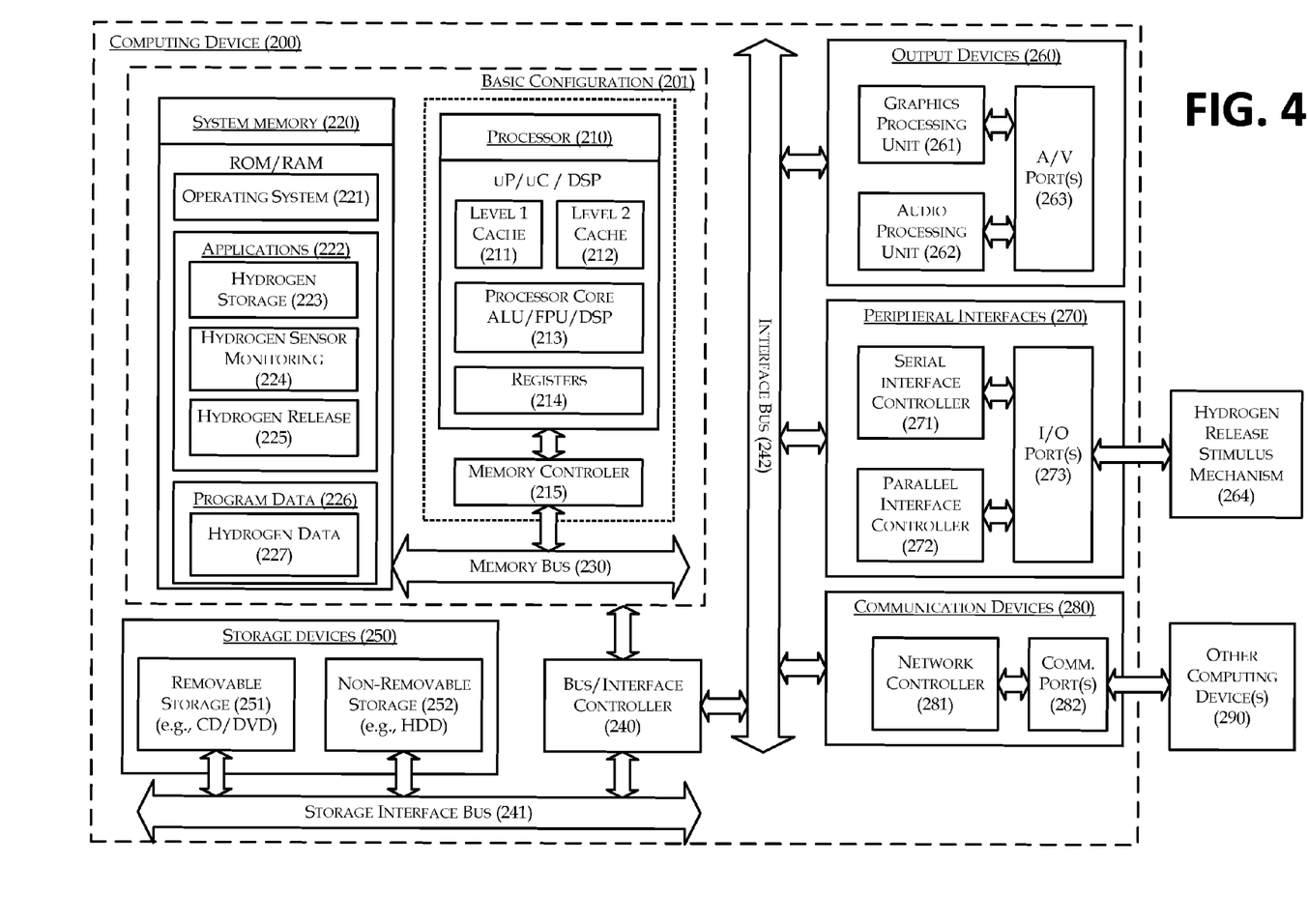
FIG. 4 is a block diagram of a computing device as one example of a device that may control one or more of the operations needed to store, monitor, and/or release hydrogen.

FIG. 4 is a block diagram of a computing device as one example of a device that may control one or more of the operations needed to store, monitor, and/or release hydrogen. In a very basic configuration 201, computing device 200 typically includes one or more processors 210 and system memory 220. A memory bus 230 may be used for communicating between the processor 210 and the system memory 220.

Depending on the desired configuration, processor 210 may be of any type including but not limited to a microprocessor (µP), a microcontroller (IC), a digital signal processor (DSP), or any combination thereof. Processor 210 may include one or more levels of caching, such as a level one cache 211 and a level two cache 212, a processor core 213, and registers 214. The processor core 213 may include an arithmetic logic unit (ALU), a floating point unit (FPU), a digital signal processing core (DSP Core), or any combination thereof. A memory controller 215 may also be used with the processor 210, or in some implementations the memory controller 215 may be an internal part of the processor 210.

Depending on the desired configuration, the system memory 220 may be of any type, including but not limited: to volatile memory (such as RAM), non-volatile memory (such as ROM, flash memory, etc.), or any combination thereof. System memory 220 typically includes an operating system 221, one or more applications 222, and program data 226. As discussed above, applications 223-225 may include, for example, an application for controlling transferring hydrogen into a storage unit 223, an application for controlling monitoring the external presence of hydrogen to detect and contain potential leaks 224, and an application for controlling releasing hydrogen from the storage unit into a destination 225.

Program data 226 may include, for example, hydrogen data 227 that is used by applications 223-225. Hydrogen data 227 may comprise, for example, tank fill level data, leakage sensor data, hydrogen release rate and release stimulus metrics.

Computing device 200 may have additional features or functionality, and additional interfaces to facilitate communications between the basic configuration 201 and any required devices and interfaces. For example, a bus/interface controller 240 may be used to facilitate communications between the basic configuration 201 and one or more data storage devices 250 via a storage interface bus 241. The data storage devices 250 may be removable storage devices 251, non-removable storage devices 252, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable and non-removable media implemented in any method or technology for storage of information, such as computer readable instructions, data structures, program modules, or other data.

System memory 220, removable storage 251, and non-removable storage 252 are all examples of computer storage media. Computer storage media includes, but is not limited to, RAM, ROM, EEPROM, flash memory or other memory technology, CD-ROM, Digital Versatile Disks (DVD) or other optical storage, magnetic cassettes, magnetic tape, magnetic disk storage or other magnetic storage devices, or any other medium that may be used to store the desired information and that may be accessed by computing device 200. Any such computer storage media may be part of device 200.

Computing device 200 may also include an interface bus 242 for facilitating communication from various interface devices (e.g., output interfaces, peripheral interfaces, and communication interfaces) to the basic configuration 201 via the bus/interface controller 240. Example output devices 260 include a graphics processing unit 261 and an audio processing unit 262, which may be configured to communicate to various external devices such as a display or speakers via one or more Audio Visual (A/V) ports 263. Example peripheral interfaces 270 include a serial interface controller 271 or a parallel interface controller 272, which may be configured to communicate with external devices such as input devices (e.g., keyboard, mouse, pen, voice input device, touch input device, etc.) or other peripheral devices (e.g., printer, scanner, etc.) via one or more Input/Output (I/O) ports 273.

For example, in this embodiment, a hydrogen release stimulus mechanism 264 may be connected via an I/O port and used to transmit and receive release control signals in order to direct a precise amount of heat or light to the release stimulus elements. I/O devices may also include audible and visual alarm devices such as speakers and sirens which may be activated when a hydrogen leak is detected via sensors on the HSU, or via other measurements such as excess flow, pressure drop, and overpressure. Along the same lines, I/O devices may include secondary shut-off valves and power shut-offs to close off the HSU in the event of a possible leak. Backup safety mechanisms such as this may be important in some embodiments due to the inherent dangers of hydrogen.

Other conventional I/O devices may be connected as well such as a mouse, keyboard, and so forth. An example communications device 280 includes a network controller 281, which may be arranged to facilitate communications with one or more other computing devices 290 over a network communication via one or more communication ports 282.

The communications connection is one example of a communication media. Communication media may typically be embodied by computer readable instructions, data structures, program modules, or other data in a modulated data signal, such as a carrier wave or other transport mechanism, and include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR), and other wireless media.

Computing device 200 may be implemented as a portion of a small-form factor portable (or mobile) electronic device such as a cell phone, a personal data assistant (PDA), a personal media player device, a wireless web-watch device, a personal headset device, an application-specific device, or a hybrid device that include any of the above functions. Computing device 200 may also be implemented as a personal computer including both laptop computer and non-laptop computer configurations.

Figure 5:
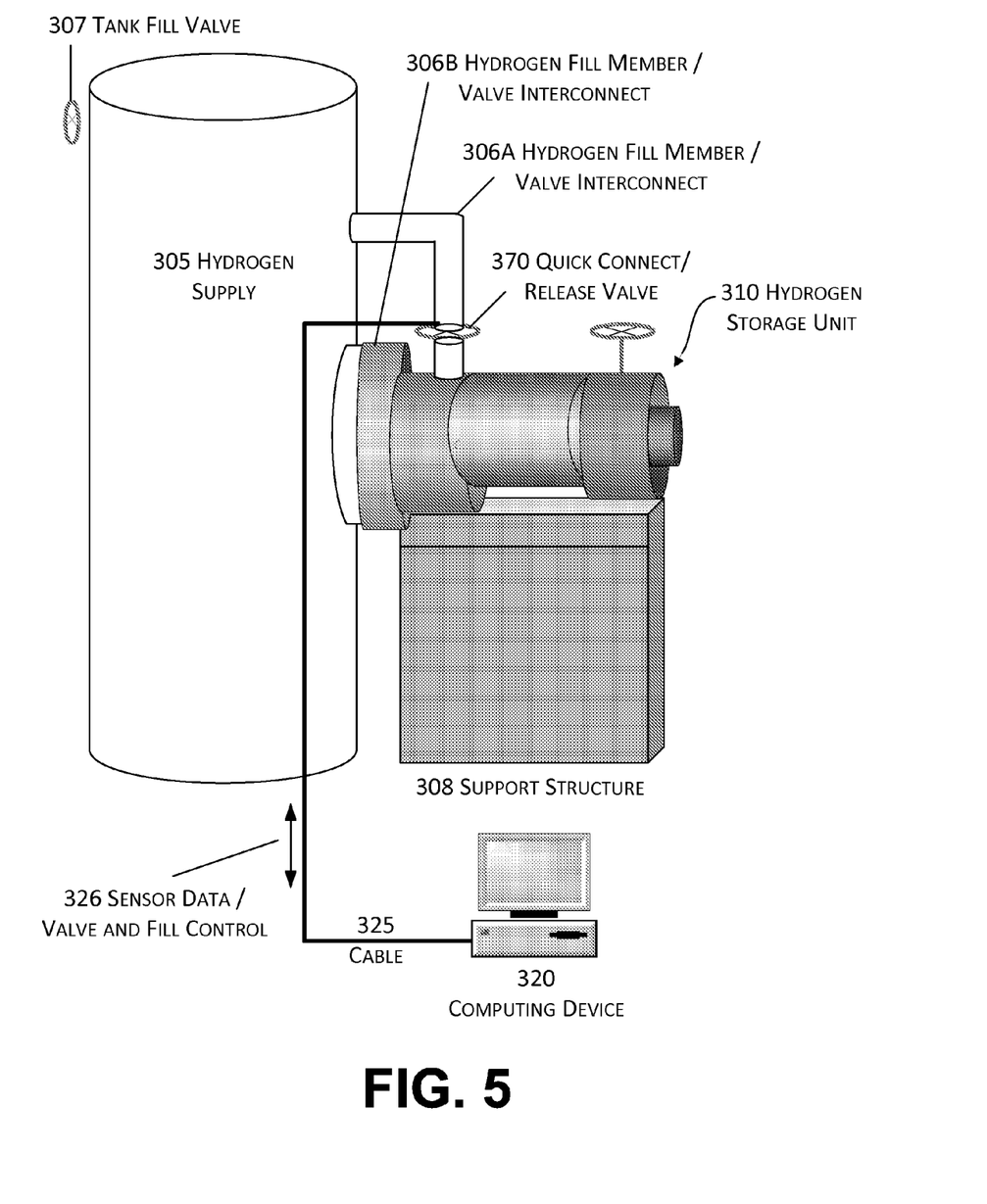
FIG. 5 is a diagram of an example hydrogen storage apparatus/method that may transfer hydrogen into the hydrogen storage unit.

FIG. 5 is a diagram of an example hydrogen storage apparatus/method that may transfer hydrogen into the hydrogen storage unit. FIG. 5 comprises a hydrogen storage unit 310 supported by a support structure 308 and connected to a hydrogen supply 305 via a quick connect/release valve 370. The hydrogen supply 305 comprises a tank fill valve 307, and may be connected to the hydrogen storage unit 310 via one or more hydrogen fill members/valve interconnects 306A, 306B. The hydrogen fill member/valve interconnects 306A, 306B may be connected to a computing device 320 via a cable 325 (or wirelessly—not shown) that may transmit sensor and/or valve and fill control data 326. Computing device 320 may be the computing device 200 depicted in FIG. 4, equipped with appropriate software for controlling the valves and monitoring fill levels of supply 305 and/or unit 310.

FIG. 5 provides one example of a mechanism for transferring hydrogen into the hydrogen storage unit 310. In this example, a hydrogen supply 305 is coupled to the hydrogen storage unit 310 via one or more hydrogen fill members/valve interconnects 306A, 306B. Depending on the configuration of the hydrogen supply 305 and the hydrogen storage unit 310, the hydrogen storage unit 310 may need to be supported by some form of support structure 308 that holds it in a fixed position. The hydrogen storage apparatus may be connected to a computing device 320 via a cable 325 that transmits instructions 326 on the amount of hydrogen to be released from the hydrogen supply 305 and into the hydrogen storage unit 310. The computing device 320 may also control the timing of the hydrogen flow, and may determine when to discontinue the flow of hydrogen, for example by closing an electronically controllable valve 306A.

The computing device 320 may further store hydrogen sensor data to enable the monitoring of potential hydrogen leaks. The computing device 320 may respond to detected leaks by closing appropriate valves to prevent further leakage and optionally alerting fill support technicians. Example alerts may include pop-up user interface element(s) displayed on the computing device 320 display, communication to one or more remote computers or mobile devices, audible and visual alarms and activation of emergency shut-off valves, as discussed above.

Figure 6:
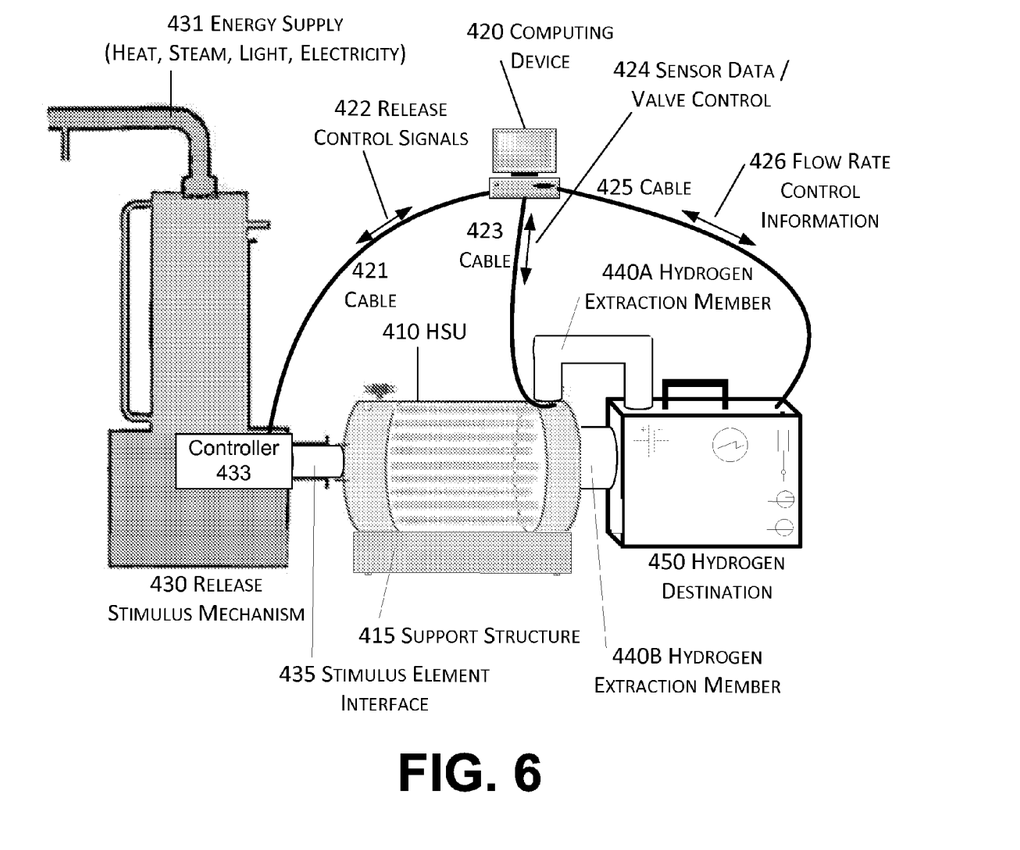
FIG. 6 is a diagram of an example hydrogen extraction apparatus/method that may stimulate the release of hydrogen from the hydrogen unit into a hydrogen destination.

FIG. 6 is a diagram of an example hydrogen extraction apparatus/method that may stimulate the release of hydrogen from the hydrogen unit into a hydrogen destination. FIG. 6 comprises an energy supply 431 coupled to a release stimulus mechanism 430. The release mechanism 430 is in turn connected to a hydrogen storage unit 410 via a stimulus element interface 435. The hydrogen storage unit 410, which may be held in a fixed position by a support structure 415, may be coupled to a hydrogen destination 450 via one or more hydrogen extraction members 440A, 440B.

A computing device 420, such as computing device 200 depicted in FIG. 4, may be connected via a connection such as cable 421, or other suitable wired or wireless connection, to an electronic controller 433 on the release mechanism 430, enabling the transmission of hydrogen release control signals 422. Computing device 420 may also be connected via a connection such as cable 423, or other suitable wired or wireless connection, to sensors and electronically controlled valves disposed on the hydrogen storage unit 410, enabling the transmission of sensor and/or valve control data 424. Computing device 420 may further be connected via a connection such as cable 425, or other suitable wired or wireless connection, to the hydrogen destination 450, enabling the transmission of flow rate control information 426.

In FIG. 6, the release mechanism 430 receives a supply of energy 431, for example, in the form of heated gas, steam, electricity, or light. The energy supply may be manually controlled, or may be controlled by a computing device 420 that dictates when the energy supply should be activated and begins the generation of heat or light. Computing device 420 may further interface with an electronic controller 433 on the hydrogen release mechanism 430, generating specific instructions regarding the transmission of heat or light to the hydrogen storage unit 410, depending on factors such as the size of the hydrogen release stimulus elements in the hydrogen storage unit 410, the stimulus method, the rate of hydrogen release as determined by flow rate measurement units disposed on the storage unit 410, or by feedback received from the hydrogen destination 450, and safety sensor feedback data. The controller 433 in turn may communicate with the stimulus element interface 435 to begin the flow of heat or light and to precisely engage and activate the hydrogen release stimulus elements disposed inside the hydrogen storage unit 410.

FIG. 6 depicts the hydrogen release stimulus elements in the hydrogen storage unit 410 after they have been engaged. As a result of the stimulus, hydrogen may be released from the packed-bed hydrogen storage columns and made available for transfer to a destination 450. The transfer process may be activated manually or with the assistance of a computing device 420 that transmits sensor and valve control data 424 to the hydrogen storage unit 410 to determine when the hydrogen release valve may safely be opened, and to determine a duration of hydrogen release, depending on the requirements of the hydrogen destination 450 and the amount of hydrogen stored in the storage unit 410.

The hydrogen flow rate may be impacted by temperature, internal and/or external pressure, and the chemical composition, dimensions, and volume of microspheres or other hydrogen storage column material. Upon receiving the sensor and valve control information, the valve may be opened and hydrogen may begin to flow through the one or more hydrogen extraction members 440A, 440B. The hydrogen extraction members 440A, 440B comprise an airtight cavity allowing safe hydrogen transport between a quick connect or other opening in the hydrogen storage unit 410 and the hydrogen destination 450.

When computing device 420 detects that the appropriate amount of hydrogen has been transferred to the destination 450, it may discontinue the hydrogen flow. Computing device 420 may also receive sensor information about the flow of hydrogen around the valve, enabling it to immediately shut off the flow if a leak is detected. Computing device 420 or a human operator, depending on the embodiment, may also flush the extraction members 440A, 440B, associated valves, or the HSU 410 to dilute or remove stray hydrogen when done transferring hydrogen to destination 450. An inert gas such as Nitrogen (N2) can be used for flushing. In one example embodiment, a flushing apparatus (not shown) comprising a tank for the flushing gas, appropriate hosing and a flush blower for circulating air through the various apparatus may be used.

The destination 450 may comprise any equipment that uses hydrogen including fuel cells, ammonia production equipment, vehicles, a subsequent storage receptacle, and so forth. The destination 450 may transmit flow rate control information 426 to computing device 420, specifying the desired amount and rate of hydrogen flow. It may transmit information that further hydrogen is not needed, triggering the computing device 420 to discontinue the hydrogen flow. The hydrogen flow may also be discontinued manually.

Figure 7:
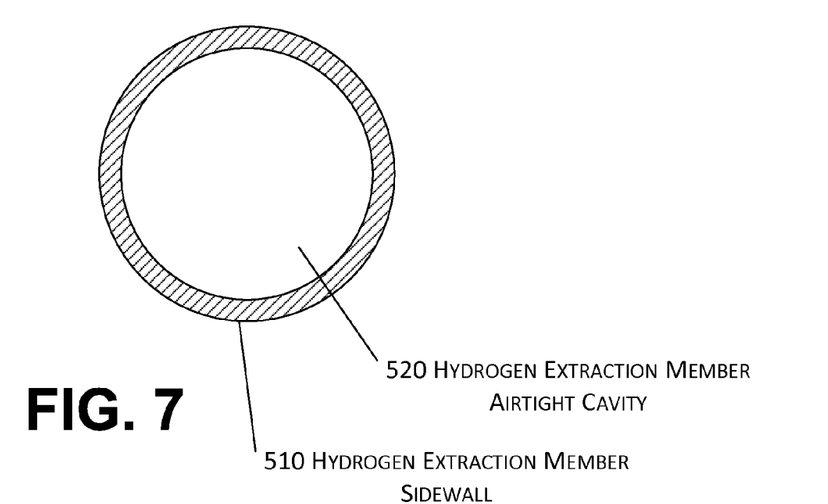
FIG. 7 is a diagram of example features of a hydrogen extraction member as one component of the hydrogen extraction unit.

FIG. 7 is a diagram of example features of a hydrogen extraction member as one component of the hydrogen extraction unit. FIG. 7 illustrates an extraction member cross-section view showing sidewall 510 and an airtight cavity 520, the extraction member forming a tube through which hydrogen may be safely transferred between the hydrogen storage unit 410 and the hydrogen destination 450 (both shown in FIG. 6).

Figure 8:
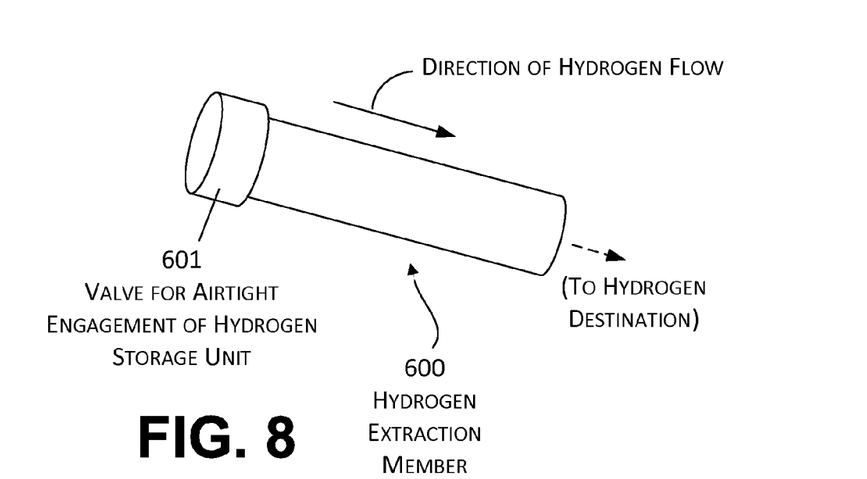
FIG. 8 is a diagram of an example hydrogen extraction member as one component of the hydrogen extraction unit.

FIG. 8 is a diagram of an example hydrogen extraction member 600 as one component of the hydrogen extraction unit. Hydrogen extraction member 600 may for example serve as element 440A in FIG. 6. FIG. 8 illustrates a side view showing a valve 601 for airtight engagement of the hydrogen storage unit. As shown in FIG. 8, upon engagement of the valve 601, hydrogen will flow through the cavity of the extraction member 600 and into the hydrogen destination. As discussed in FIG. 6, the hydrogen flow may be controlled manually or through a computing device, such as computing device 200 depicted in FIG. 4, configured to control hydrogen flow.

Figure 9:
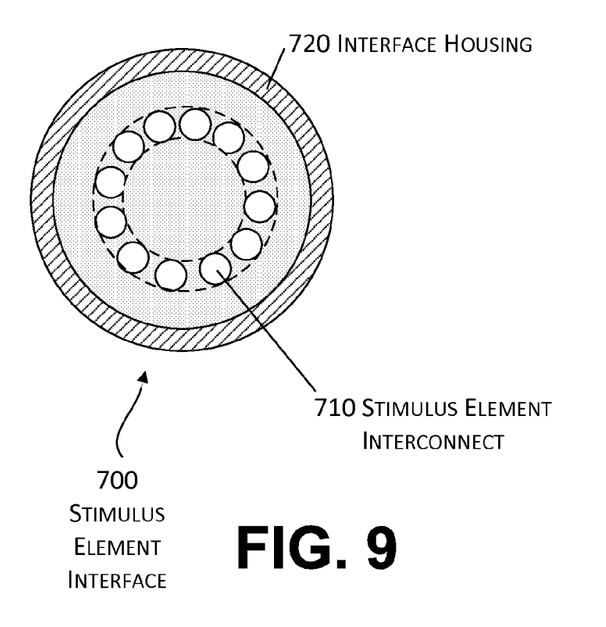
FIG. 9 is a diagram of an example hydrogen release stimulus element interface as one component of the hydrogen extraction unit.

FIG. 9 is a diagram of an example hydrogen release stimulus element interface 700 as one component of the hydrogen extraction unit. The example interface 700 comprises an interface housing 720 and a plurality of stimulus element interconnects 710. The stimulus element interface 700 may be configured for controllable activation of the one or more hydrogen release stimulus elements when the hydrogen storage unit is disposed in a fixed position relative to an extraction unit, causing the stimulus elements to be arranged in a precise configuration for optimal heat or light stimulus to trigger the release of hydrogen from the packed-bed hydrogen storage columns disposed inside the hydrogen storage unit. Depending on the method of stimulus, the stimulus element interconnect 710 may be variously configured to transfer release stimulus energy such as heat or light to an individual hydrogen release stimulus element in the hydrogen storage unit. The stimulus element interconnect 710 may be individually controllable in some embodiments to allow control of hydrogen release from desired locations in a hydrogen storage unit.

Figure 10:
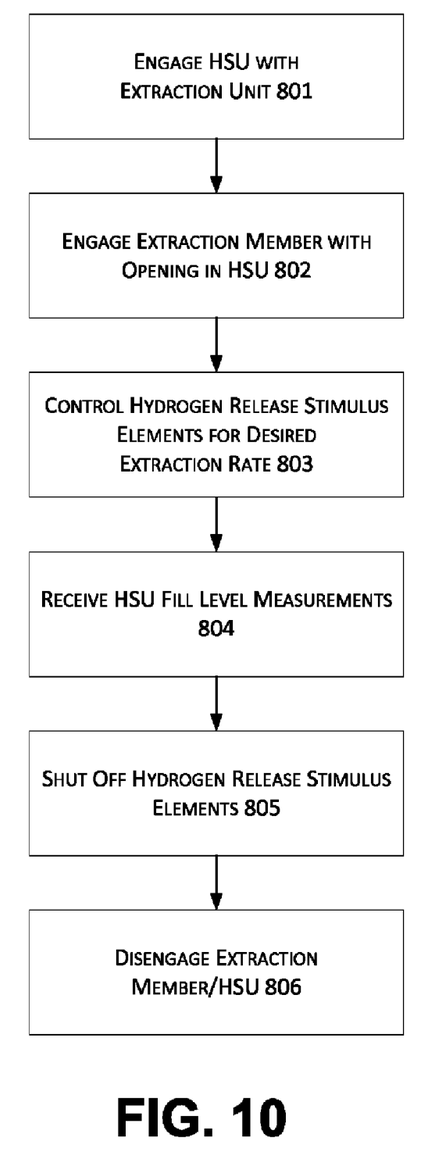
FIG. 10 is a flow diagram of an example method for extracting hydrogen from a hydrogen storage unit.

FIG. 10 is a flow diagram of an example method for extracting hydrogen from a hydrogen storage unit. FIG. 10 comprises operations 801-806. Operations 801-806 include an "Engage HSU with Extraction Unit" operation 801, an "Engage Extraction Member with Opening in HSU" operation 802, a "Control Hydrogen Release Stimulus Elements for Desired Extraction Rate" operation 803, a "Receive HSU Fill Level Measurements" operation 804, a "Shut Off Hydrogen Release Stimulus Elements" operation 805, and a "Disengage Extraction Member/HSU" operation 806.

In FIG. 10, operations 801-806 are illustrated as being performed sequentially, with operation 801 first and operation 806 last. It will be appreciated however that these operations may be re-ordered as convenient to suit particular embodiments, and that these operations or portions thereof may be performed concurrently in some embodiments.

In an "Engage HSU with Extraction Unit" operation 801, the hydrogen storage unit is connected to a release mechanism coupled to an energy supply that will provide a heat, steam, light, or electrical stimulus to the hydrogen release stimulus elements disposed inside the hydrogen storage unit. The hydrogen storage unit and the release mechanism may be engaged through a controller connected to a stimulus element interface that optimally positions the stimulus elements to safely and efficiently trigger the hydrogen release.

In an "Engage Extraction Member with Opening in HSU" operation 802, the valve on the hydrogen extraction member is connected to the corresponding structure on the hydrogen storage unit while the hydrogen storage unit is in a fixed position, creating an airtight connection between the hydrogen storage unit and the extraction member that will allow the released hydrogen to flow through the hydrogen extraction member to the hydrogen destination.

In a "Control Hydrogen Release Stimulus Elements for Desired Extraction Rate" operation 803, the controller connected to the hydrogen release stimulus element interface may be used to engage the hydrogen release stimulus elements disposed inside the hydrogen storage unit. This action may be controlled by a computing device that determines the necessary configuration of the hydrogen release stimulus elements for optimal heat or light stimulus to trigger the release of hydrogen from the packed-bed hydrogen storage columns housed inside the hydrogen storage unit. The computing device may further calculate the amount and duration of heat or light stimulus needed to achieve the desired extraction rate, and may transmit that information to the controller connected to the hydrogen release stimulus element interface, thereby activating the hydrogen release stimulus elements and triggering the release of hydrogen through the hydrogen extraction member and into the hydrogen destination. The desired flow rate may be impacted by temperature, internal and/or external pressure (which may change somewhat with application of heat as a release stimulus), and the chemical composition, dimensions, and volume of the microspheres or other hydrogen storage column material.

In a "Receive HSU Fill Level Measurements" operation 804, the computing device or the controller connected to the hydrogen release stimulus element interface may receive information about the level of hydrogen in a hydrogen storage unit. This information may be calculated based on direct measurements inside the storage unit for example by sensors disposed inside an HSU, the capacity of the storage unit, or the established hydrogen extraction rate and elapsed extraction time, or transmitted by a sensor in the destination receptacle that indicates when the receptacle has reached the desired fill level.

In a "Shut Off Hydrogen Release Stimulus Elements" operation 805, upon receiving fill level information or, for example, sensor data indicating a leak, the computing device or the controller connected to the hydrogen release stimulus element interface may discontinue the heat or light stimulus in order to stop the release of hydrogen from the packed-bed hydrogen storage columns. In some embodiments, a cooling system may be implemented to prevent additional hydrogen from being released while the hydrogen release stimulus elements cool down. In other embodiments, the valve(s) between the hydrogen storage unit and the hydrogen destination receptacle may automatically close upon indicating that the fill level has been reached.

In a "Disengage Extraction Member/HSU" operation 806, the hydrogen extraction member is disconnected from the hydrogen storage unit and the hydrogen destination.

Figure 11:
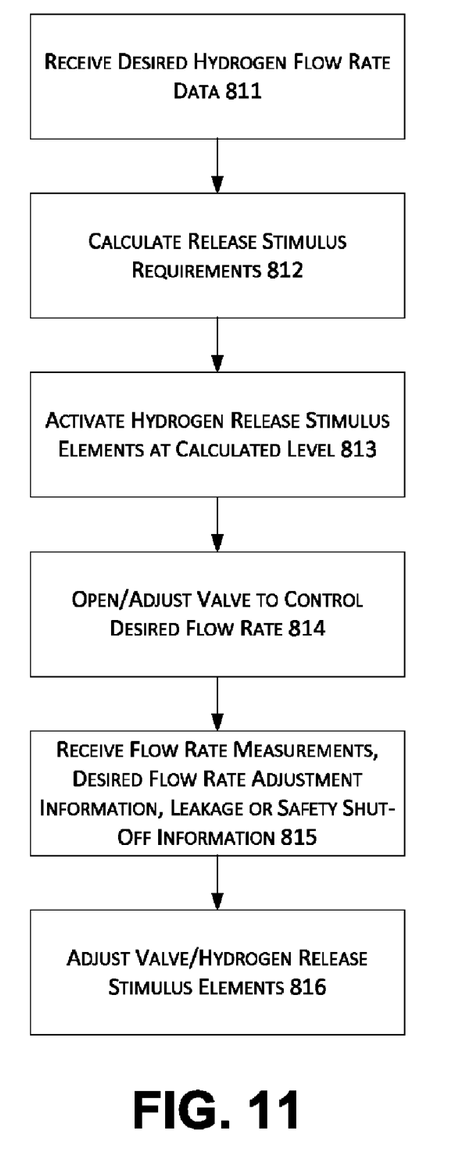
FIG. 11 is a flow diagram of an example method for controlling the hydrogen release stimulus elements for the desired extraction rate, all arranged in accordance with the present disclosure.

FIG. 11 is a flow diagram of an example method for controlling the hydrogen release stimulus elements for the desired extraction rate. The operations of FIG. 11 may be carried out in some embodiments to perform operation 803 illustrated in FIG. 10. FIG. 11 comprises operations 811-816. Operations 811-816 include a "Receive Desired Hydrogen Flow Rate Data" operation 811, a "Calculate Release Stimulus Requirements" operation 812, an "Activate Hydrogen Release Stimulus Elements at Calculated Level" operation 813, an "Open/Adjust Valve to Control Desired Flow Rate" operation 814, a "Receive Flow Rate Measurements, Desired Flow Rate Adjustment Information, Leakage or Safety Shut-Off Information" operation 815, and an "Adjust Valve/Hydrogen Release Stimulus Elements" operation 816.

In a "Receive Desired Hydrogen Flow Rate Data" operation 811, the computing device 420 from FIG. 6, a human operator, or the controller 433 connected to the hydrogen release stimulus element interface, and in some embodiments any combination of these actors, receives information about the desired rate of hydrogen flow from the hydrogen storage unit to the hydrogen destination. The desired rate may be affected by requirements of the hydrogen destination, as well as by the properties of the hydrogen storage unit in some embodiments. For example, in one embodiment a hydrogen destination such as a hydrogen based electrical power generator may provide desired flow rate data to a human operator by means of information printed on the hydrogen destination. The human may then enter the flow rate data into a computing device such as 420 in FIG. 6. In this embodiment, the computing device "receives desired hydrogen flow rate data" by virtue of the data being entered by the human operator. In another embodiment, the hydrogen destination may supply an electronic communications port that allows a cable such as cable 425 in FIG. 6 to transmit flow rate data directly to computer 420.

In a "Calculate Release Stimulus Requirements" operation 812, the computing device 420 from FIG. 6, a human operator, or the controller 433 connected to the hydrogen release stimulus element interface, and in some embodiments any combination of these actors, calculates the amount and duration of stimulus required in order to achieve the desired hydrogen flow rate, based on factors such as the type of stimulus being used to trigger the release of hydrogen, the properties of the hydrogen storage unit such as the efficacy of hydrogen release stimulus elements at releasing hydrogen and/or the properties of the packed-bed hydrogen storage columns, ambient conditions, valve diameter, whether the hydrogen storage column casing material is permeable or impermeable, and measurement data regarding existing flow rate and existing release stimulus energy, which may be used to adjust the stimulus energy to produce a desired hydrogen release/flow rate.

In an "Activate Hydrogen Release Stimulus Elements at Calculated Level" operation 813, the computing device 420 from FIG. 6, a human operator, or the controller 433 connected to the hydrogen release stimulus element interface, and in some embodiments any combination of these actors, initiates the flow of release stimulus energy to activate the hydrogen release stimulus elements at the calculated intensity and duration, which may be adjusted in real time to maintain or change a desired flow rate as described above. For example, in one embodiment, a human operator may cause a computing device such as 420 in FIG. 6 to activate controller 433 to allow hydrogen release stimulus energy, such as light or heat, into the storage unit according to the release stimulus requirements determined in the previous operation.

In an "Open/Adjust Valve to Control Desired Flow Rate" operation 814, the computing device 420, a human operator, electronically controlled valves, and in some embodiments any combination of these actors, may open one or more valves between the hydrogen storage unit and the hydrogen destination to allow the flow of hydrogen through the hydrogen extraction member and into the hydrogen destination. Sensors in the valve or the units may provide feedback about the actual rate of hydrogen flow, allowing the computing device or human operator to adjust the valve opening to achieve the desired flow. In either embodiment, flow rate data may be displayed in real time on the computing device 420 display.

In a "Receive Flow Rate Measurements, Desired Flow Rate Adjustment Information, Leakage or Safety Shut-Off Information" operation 815, the computing device 420, a human operator, electronically controlled valves, and in some embodiments any combination of these actors, may receive information from the release mechanism, the hydrogen storage unit, or the hydrogen destination regarding the hydrogen flow rate and the presence of any stray hydrogen around the valves and interfaces. For example, the computing device 420 may receive information regarding a flow rate from the hydrogen destination 450 via cable 426 and may display this information on a display for viewing by a human operator.

In an "Adjust Valve/Hydrogen Release Stimulus Elements" operation 816, the computing device 420 from FIG. 6, a human operator, or the controller 433 connected to the hydrogen release stimulus element interface, and in some embodiments any combination of these actors, may, in response to receiving the information in operation 815, communicate with the controller 433 to adjust the amount of stimulus and thereby the hydrogen flow rate, or to adjust and/or close any valves.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. The implementer may also opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various embodiments have been disclosed herein, other aspects and embodiments will be apparent to those skilled in art.

The invention claimed is:

1. A hydrogen storage unit, comprising:
a housing that forms an airtight cavity;
one or more openings formed in the housing, the openings configured to form airtight seals;
a plurality of hydrogen storage columns disposed within the cavity, the hydrogen storage columns comprising a hydrogen absorbing material inside column casings; and
a plurality of hydrogen release stimulus elements disposed within the cavity, the hydrogen release stimulus elements comprising casings separate from the hydrogen storage columns, wherein each hydrogen release stimulus element is substantially adjacent to two or more hydrogen storage columns, and wherein the hydrogen release stimulus elements are interspersed among the hydrogen storage columns;
wherein the hydrogen release stimulus elements are controllable to stimulate hydrogen release from the hydrogen absorbing material in the hydrogen storage columns.

2. The hydrogen storage unit of claim 1, wherein the hydrogen storage columns comprise packed-bed hydrogen storage columns.

3. The hydrogen storage unit of claim 1, wherein the one or more openings comprise quick-connect valves.

4. The hydrogen storage unit of claim 1, wherein the hydrogen absorbing material comprises one or more of carbon nanotubes, zeolites, metal hydrides, and glass microspheres.

5. A hydrogen storage unit, comprising:
a housing that forms an airtight cavity;
one or more openings formed in the housing, the openings configured to form airtight seals;
a plurality of hydrogen storage columns disposed within the cavity, the hydrogen storage columns comprising a hydrogen absorbing material inside column casings, wherein the column casings comprise tubular airtight housings that are open on at least one end to allow laminar flow of released hydrogen out the at least one end of a storage column; and
a plurality of hydrogen release stimulus elements disposed within the cavity, the hydrogen release stimulus elements interspersed among the hydrogen storage columns;
wherein the hydrogen release stimulus elements are controllable to stimulate hydrogen release from the hydrogen absorbing material in the hydrogen storage columns.

6. The hydrogen storage unit of claim 5, wherein the column casings comprise gas chromatography columns.

7. The hydrogen storage unit of claim 1, wherein the column casings comprise tubular hydrogen-permeable housings to allow for hydrogen transfer through the sidewalls of the permeable housings.

8. A hydrogen storage unit, comprising:
a housing that forms an airtight cavity;
one or more openings formed in the housing, the openings configured to form airtight seals;
a plurality of hydrogen storage columns disposed within the cavity, the hydrogen storage columns comprising a hydrogen absorbing material inside column casings; and
a plurality of hydrogen release stimulus elements disposed within the cavity, the hydrogen release stimulus elements comprising lighting columns and interspersed among the hydrogen storage columns;

wherein the hydrogen release stimulus elements are controllable to stimulate hydrogen release from the hydrogen absorbing material in the hydrogen storage columns.

9. The hydrogen storage unit of claim 8, wherein the lighting columns comprise optical fibers arranged to illuminate a length of the columns by providing lateral optical outlets along the columns.

10. The hydrogen storage unit of claim 1, wherein the hydrogen release stimulus elements comprise heating columns.

11. The hydrogen storage unit of claim 10, wherein the heating columns comprise tubing for heated gas or steam flow.

12. The hydrogen storage unit of claim 10, wherein the heating columns comprise inductive heating elements.

13. The hydrogen storage unit of claim 1, further comprising one or more hydrogen sensors affixed to the housing.

14. A method for storing hydrogen in a hydrogen storage unit, the method comprising:
   coupling a hydrogen supply to a hydrogen storage unit, the hydrogen storage unit comprising:
   a housing that forms an airtight cavity;
   one or more openings formed in the housing, the openings configured to form airtight seals;
   a plurality of hydrogen storage columns disposed within the cavity, the hydrogen storage columns comprising a hydrogen absorbing material inside column casings; and
   a plurality of hydrogen release stimulus elements disposed within the cavity, the hydrogen release stimulus elements comprising lighting columns and interspersed among the hydrogen storage columns;
   wherein the hydrogen release stimulus elements are controllable to stimulate hydrogen release from the hydrogen absorbing material in the hydrogen storage columns; and
   releasing hydrogen from the hydrogen supply into the hydrogen storage unit.

15. The method of claim 14, further comprising extracting hydrogen from the hydrogen storage unit with an extraction unit comprising:
   a hydrogen extraction member configured for airtight engagement of an opening in a hydrogen storage unit, the hydrogen extraction member comprising at least a sidewall and an airtight cavity for hydrogen transport through the hydrogen extraction member; and
   a hydrogen release stimulus element interface for engagement of one or more hydrogen release stimulus elements disposed inside the hydrogen storage unit, the interface configured for controllable activation of the one or more hydrogen release stimulus elements.

16. The method of claim 14, further comprising controlling hydrogen release stimulus elements disposed inside the hydrogen storage unit to attain a desired hydrogen extraction rate.

* * * * *

UNITED STATES PATENT AND TRADEMARK OFFICE
CERTIFICATE OF CORRECTION

PATENT NO. : 8,052,784 B2
APPLICATION NO. : 12/434414
DATED : November 8, 2011
INVENTOR(S) : Field It is certified that error appears in the above-identified patent and that said Letters Patent is hereby corrected as shown below:

In the Drawings:

In Fig. 4, Sheet 3 of 8, delete "uP/ uC / DSP" and insert -- $\mu P/ \mu C / DSP$ --, therefor.

In Fig. 4, Sheet 3 of 8, in Box "(215)", in Line 1, delete "CONTROLER" and insert -- CONTROLLER --, therefor.

In the Specifications:

In Column 1, Line 28, delete "is" and insert -- are --, therefor.

In Column 6, Line 46, delete "(IC)," and insert -- ($\mu C$), --, therefor.

In Column 7, Line 17, delete "(HDD)," and insert -- (HDDs), --, therefor.

In Column 7, Line 19, delete "(SSD)," and insert -- (SSDs), --, therefor.

In Column 7, Line 29, delete "(DVD)" and insert -- (DVDs) --, therefor.

In Column 10, Line 9, delete "(N2)" and insert -- ($N_2$) --, therefor.

In Column 10, Line 11, delete "hosing" and insert -- housing --, therefor.

In the Claims:

In Column 16, Line 40, in Claim 5, delete "out the" and insert -- out of the --, therefor.

Signed and Sealed this
Eighteenth Day of June, 2013

Teresa Stanek Rea
*Acting Director of the United States Patent and Trademark Office*